United States Patent [19]

Janotik

[11] 4,124,086
[45] Nov. 7, 1978

[54] ELECTRIC VEHICLE DRIVE TRAIN HAVING UNIPOLAR MOTOR

[75] Inventor: Adam M. Janotik, Grosse Ile, Mich.

[73] Assignee: Ford Motor Company, Dearborn, Mich.

[21] Appl. No.: 863,099

[22] Filed: Feb. 10, 1978

[51] Int. Cl.² ........................................... B60K 17/08
[52] U.S. Cl. ................................. 180/65 R; 310/219
[58] Field of Search ............. 180/65 R, 65 PS, 54 R; 310/115, 219, 83, 178; 318/9, 11, 12, 253

[56] References Cited

U.S. PATENT DOCUMENTS

| | | | |
|---|---|---|---|
| 3,185,877 | 5/1965 | Sears | 310/115 |
| 3,861,485 | 1/1975 | Busch | 180/65 R |
| 3,866,703 | 2/1975 | Eastham | 180/65 R |
| 3,984,715 | 10/1976 | Kullmann et al. | 310/219 |
| 4,034,248 | 7/1977 | Mok et al. | 310/219 X |

*Primary Examiner*—Joseph F. Peters, Jr.
*Assistant Examiner*—Gene A. Church
*Attorney, Agent, or Firm*—Robert W. Brown; Clifford L. Sadler

[57] ABSTRACT

An electric vehicle drive train having a unipolar motor connected between a DC source of electrical energy and a differential or other mechanism for turning the wheels of an electric vehicle. The DC source consists of a low-voltage battery or thermoelectric generator which has first and second electrodes. One of the electrodes is the container of the DC source and the other source electrode is connected to a control member forming a part of the unipolar motor. The unipolar motor is positioned within a recess of the DC source container and is in electrical contact therewith so that current flows from the control member of the motor, through the motor's internal structure, and into the motor housing portion attached to the container. This provides a very compact electric vehicle drive train with the DC source located as close as possible to the unipolar motor. Preferably the motor is vertically positioned between the DC source located above it and the vehicle differential located beneath it.

9 Claims, 3 Drawing Figures

4,124,086

ELECTRIC VEHICLE DRIVE TRAIN HAVING UNIPOLAR MOTOR

BACKGROUND

This invention relates to an electric vehicle drive train having a unipolar motor.

A unipolar or homopolar motor is a DC dynamoelectric machine that operates at high current and low voltage. It is a motor which has high efficiency and a high power-to-weight to volume ratio. Unipolar motors are described in U.S. Pat. Nos. 3,185,877 to A. Sears; 3,453,467 to L. M. Harvey; 3,916,235 to E. Massar; and 3,984,715 to D. Kullman et al. However, the preferred form of unipolar motor for use in connection with the present invention is described in commonly assigned patent application of the present inventor entitled, "Unipolar Dynamoelectric Machine with Variable Resistance Control" Ser. No. 863100, filed Dec. 1977.

The torque-producing characteristics of the unipolar machine described in the inventor's patent application identified in the preceding paragraph makes this machine particularly suitable for use as a traction motor in electric vehicle applications. However, because unipolar motors operate at low voltage and high current, for example, 10,000 amps, the DC source of electrical energy used to supply such motors must be located in proximity to the motors to prevent undue resistive electrical power losses. Moreover, the DC source of electrical energy used to supply the unipolar motor should have a high energy density.

Sodium-sulfur and other alkali metal batteries and DC sources developed by the assignee of the present invention, Ford Motor Company, are described in the following U.S. Pat. Nos. 3,404,035; 3,404,036; 3,413,150; 3,446,677; 3,468,709; 3,468,719; 3,475,220; 3,475,225; 3,488,271; 3,514,332; 3,535,163; 3,719,531; 3,811,943; 3,951,689; 3,966,492; 3,976,503; 3,980,496; 3,985,575; 3,985,576; and 4,049,889. The drive train of the invention also may be used with heat engines or thermoelectric generators or other low-voltage, high-current DC sources of electrical energy.

The sodium-sulfur batteries and heat engines mentioned above typically produce, for each cell in the case of the sodium-sulfur battery and sodium heat engine, a voltage of about 1.5 volts. Simplicity of construction of the heat engine or sodium-sulfur battery occurs if the various battery cells are connected in parallel rather than in series. If this is done, only a low voltage is produced but a very high current capability is provided. The high energy density capability of this DC source may be utilized to provide a practical energy source for an electric vehicle.

The low voltage produced by a parallel-connected battery as described above may be used to advantage by a unipolar motor. The present invention provides a drive train for an electric vehicle which takes advantage both of the unique properties of the unipolar dynamoelectric machine and the unique characteristics of the DC sources mentioned above.

SUMMARY OF THE INVENTION

This invention relates to a drive train for an electric vehicle. The drive train has a unipolar or homopolar motor and includes a DC source of low-voltage electrical energy having a plurality of cells connected in parallel. The DC source includes an electrically conductive container forming one electrode common to each of the cells. A control member of the unipolar motor is electrically connected to the other electrode of each of the cells. The control member extends downwardly from the DC source and is located in a recess formed in the container. The unipolar motor has a stator and a rotor. The control member of the motor extends into an opening in the rotor and the rotor rotates about this control member. The housing of the unipolar motor is mounted within the recess formed in the DC source container and a voltage is produced between the control member and the housing of the motor. A liquid metal within the motor is used to control the current flow between the control member and the housing or stator of the motor, which in turn is electrically connected to the container. The unipolar motor preferably has an output shaft that enters a differential mechanism suitable for use in producing the output torque required to drive the wheels of an electric vehicle.

The invention may be better understood by reference to the detailed description which follows and to the drawings.

DETAILED DESCRIPTION

Figure 1:
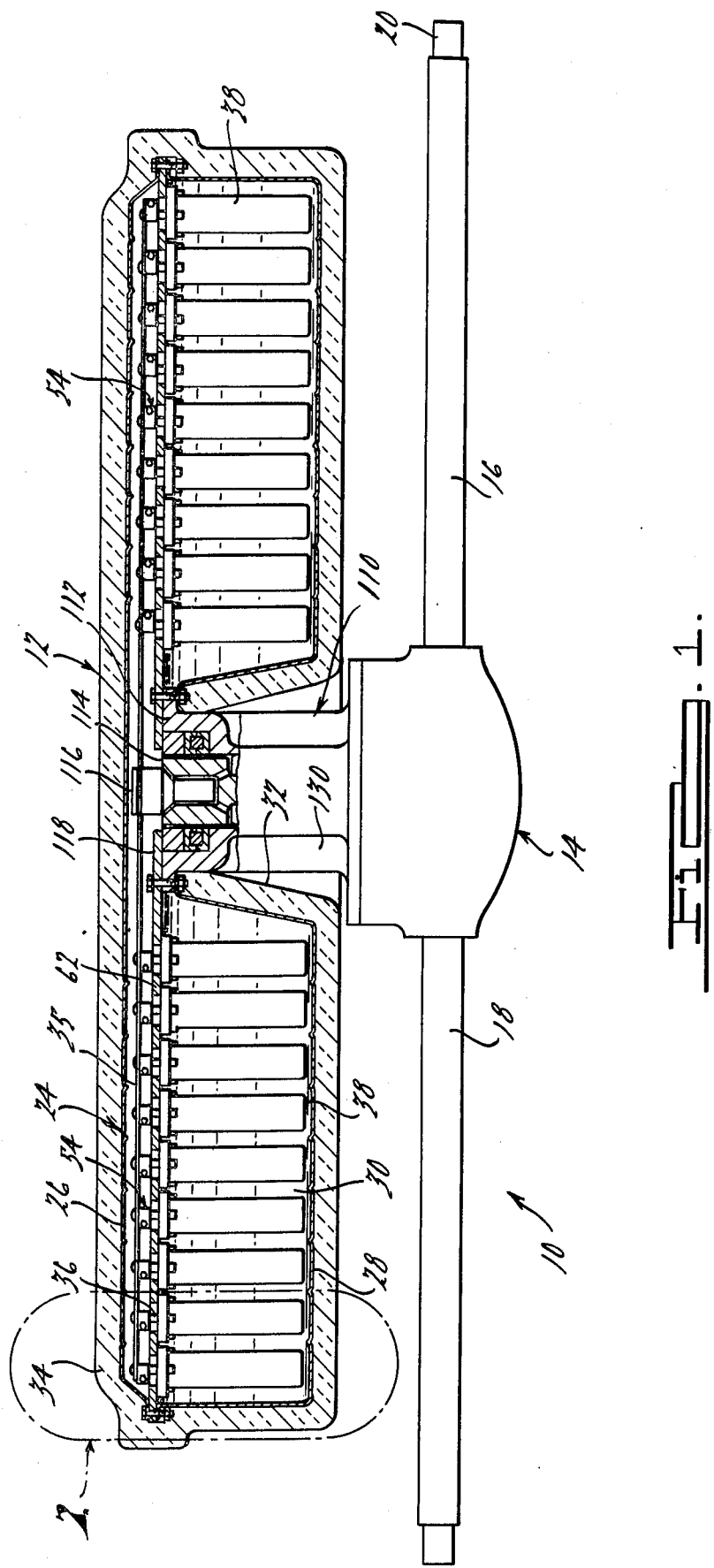
FIG. 1 is a schematic diagram of a drive train having a sodium-sulfur battery DC source and a unipolar motor. The drive train is particularly suitable for use in electric vehicle applications.

With reference now to the drawings, wherein like numerals refer to like items in the several views, there is shown in FIG. 1 a schematic diagram of a drive train for an electric vehicle. The drive train, generally designated by the numeral 10, includes a DC source of electrical energy 12 in the form of a sodium-sulfur battery having a plurality of cells connected in parallel. The drive train also has a differential 14, which may be of conventional design, having hollow axles 16 and 18 through which axle shafts 20 and 22, respectively, pass to provide drive for the wheels (not shown) of the electrically driven vehicle with which the drive train is used.

A unipolar motor 110 is positioned between the DC source 12 and the differential 14. A shaft 140 (FIG. 3) in the motor 110 enters the differential 14 to provide the drive, through the gearing of the differential, to the axle shafts 20 and 22.

The sodium sulfur battery 12 includes a container or housing 24 formed from an upper part 26 and a lower part 28. This container preferably is formed from low carbon or stainless steel that may be stamped to produce the desired configuration. It may be seen that the lower part 28 of the container has a flange 118 that is in electrical contact with a corresponding flange on a conductive portion of the stator 112 of the unipolar motor 110.

Container 26, 28 and its flange 118 actually form one electrode of the sodium-sulfur battery and are in electrical contact with liquid sodium, a liquid metal, contained in the space 30 in the battery 12. Thus, the container for the battery is an electrode of this DC source and is in direct contact with the stator of the unipolar motor 110, which is positioned within recessed area 32 of container part 28. The container parts 26 and 28 are covered with thermal insulation 34 to prevent heat transfer from the battery to the surrounding medium. This thermal insulation is necessary to limit heat loss from the sodium sulfur battery, as is desirable for this type of battery because it must be operated at elevated temperature.

The unipolar motor 110 has a control member 116 connected to another electrode 35 of the battery 12. Each cell of the battery includes a rod 36 that is electrically conductive and connected to the electrode 35. This rod is insulated from container part 28. The rods 36 extend into closed-end, tube-shaped ionically-conductive ceramic membranes 38.

Figure 2:
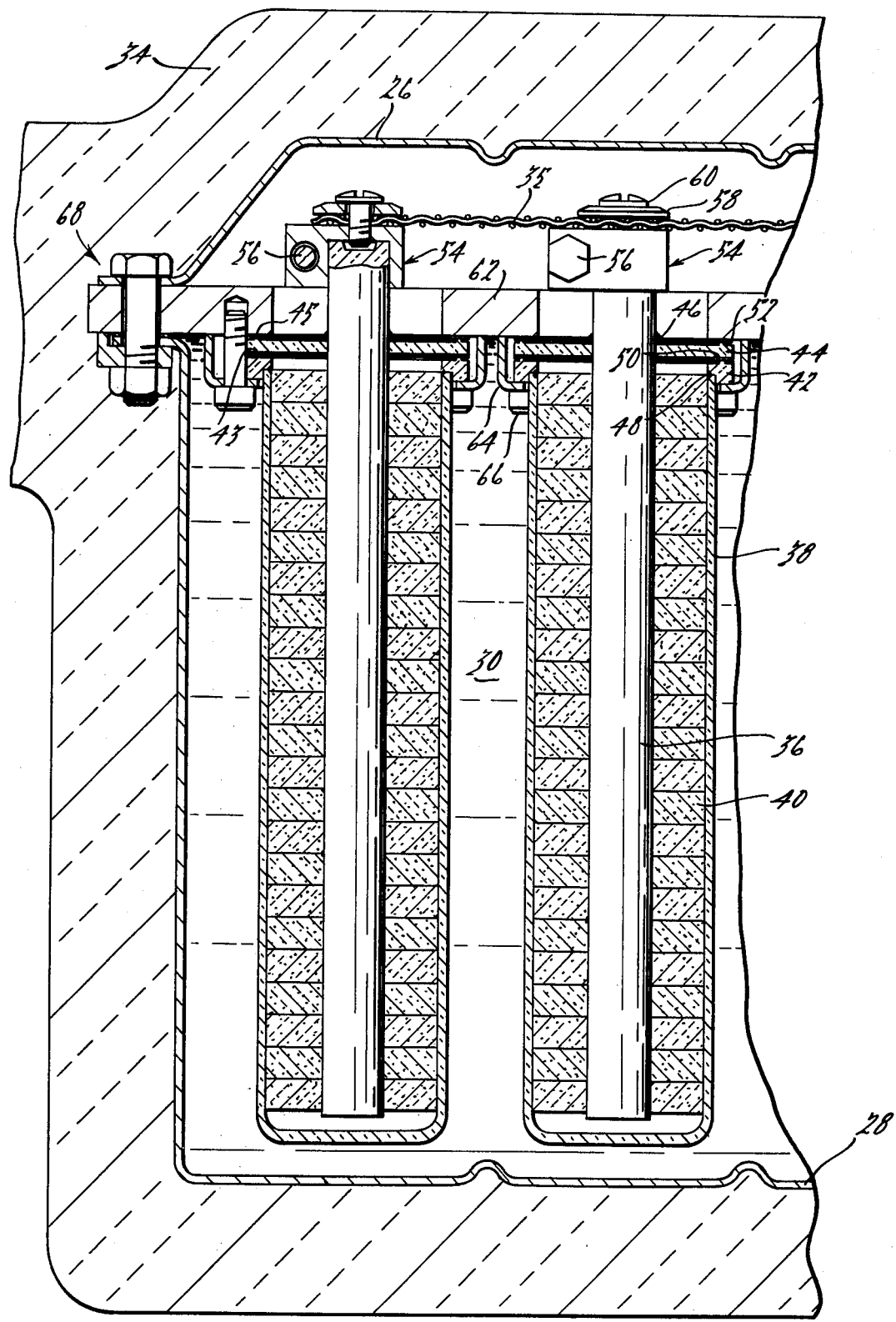
FIG. 2 is a sectional view of the circled portion 2 in FIG. 1 including two of the cells in the sodium-sulfur battery illustrated in FIG. 1.

With particular reference now to FIG. 2, there is shown the detailed structure of two of the cells of a sodium-sulfur battery as illustrated more schematically in the circled portion 2 of FIG. 1. It should be noted in FIG. 2 that the container parts 26 and 28 are separated by a conductive member 62 which has the flange 118 electrically connected to the motor housing 112 (FIG. 1). The member 62 provides support for the various tubular ceramic membranes 38 forming or dividing the battery into the various parallel-connected cells. The members 26, 62 and 28 are fastened together at 64, and an aluminum foil seal is placed between the surfaces of member 62 and container part 28 in the flange area clamped together at 64. This is designed to prevent leakage of liquid sodium contained in region 30 of the battery. Of course, the battery 12 must be maintained at a temperature sufficient to keep the sodium in region 30 in a liquid state as is well known.

The tubular ceramic membranes 38 preferably are made from beta-alumina solid electrolyte material, which is a conductive ceramic material. Also, the rods 36 preferably are made from this conductive ceramic material or carbon, but may be made from other conductive materials capable of surviving in the presence of polysulfide materials contained in the region 40 between the rods 36 and the tubular ceramic elements 38. The region 40 is filled with carbon felt washer shaped elements, which are initially saturated with sulfur.

In the operation of the sodium-sulfur battery, sodium ions in the sodium compartment area 30 migrate through the tubular conductive ceramic membranes 36 and react with the polysulfide and sulfur materials in region 40 to produce additional or different polysulfide compounds. In so doing, the sodium ions receive an electron at the rod or cathode structures 36 and, therefore, there is a current flow between the rods 36, connected in parallel by the conductive wire mesh 35 attached to the various rods 36 by screws 60 associated with conductive washers 58. Current flow is between this complete cathode structure assembly, including the rods and wire mesh, and the container portion 28 forms the anode of the battery.

The polysulfide and sulfur materials in the region 40 of each of the tubular ceramic elements is a highly corrosive material, and it is necessary to seal this material within the individual cells. For this purpose, annular seal members 42 and 44 are provided. Member 42 is a washer-like element that is attached to the tubular ceramic electrolyte element 38 and is maintained thereon by a glass seal 48. Both of the annular insulating material, which is a material similar to that conventionally employed in the insulators of spark plugs. Member 44 is attached to the rod 36 by a glass seal 46. The member 42 has an annular ridge 43, and member 44 has an annular ridge 45. Between members 42 and 44 and in the region of the ridge 43, a piece of annular-shaped aluminum foil is positioned to form a seal between members 42 and 44. A similar annular aluminum-foil seal is provided between members 44 and 62 at the location of the ridge 45. The two separate sealing members 42 and 44 facilitate assembly of the various cells because members 44 can be attached to members 36 prior to assembly of these members as a unit into the container holding and supporting the various tubular ceramic membranes 38. These membranes 38 are retained in position by annular metallic members 64 that are secured to member 62 by screws 66 as illustrated. It should be noted that the rods 36 are secured to the conductive wire mesh 35 with elements 54 which clamp the wire mesh, by means of screws 56, to the individual rods 36.

The DC source of electrical energy 12 preferably is a sodium-sulfur battery as described, but variations may be made in both design and type of DC source used in the vehicle drive train disclosed herein. For example, the DC source voltage may be obtained from a sodium heat engine that produces a voltage due to a temperature differential existing between liquid sodium regions separated by an ionically conductive membrane, such as beta-ceramic membrane 28.

Figure 3:
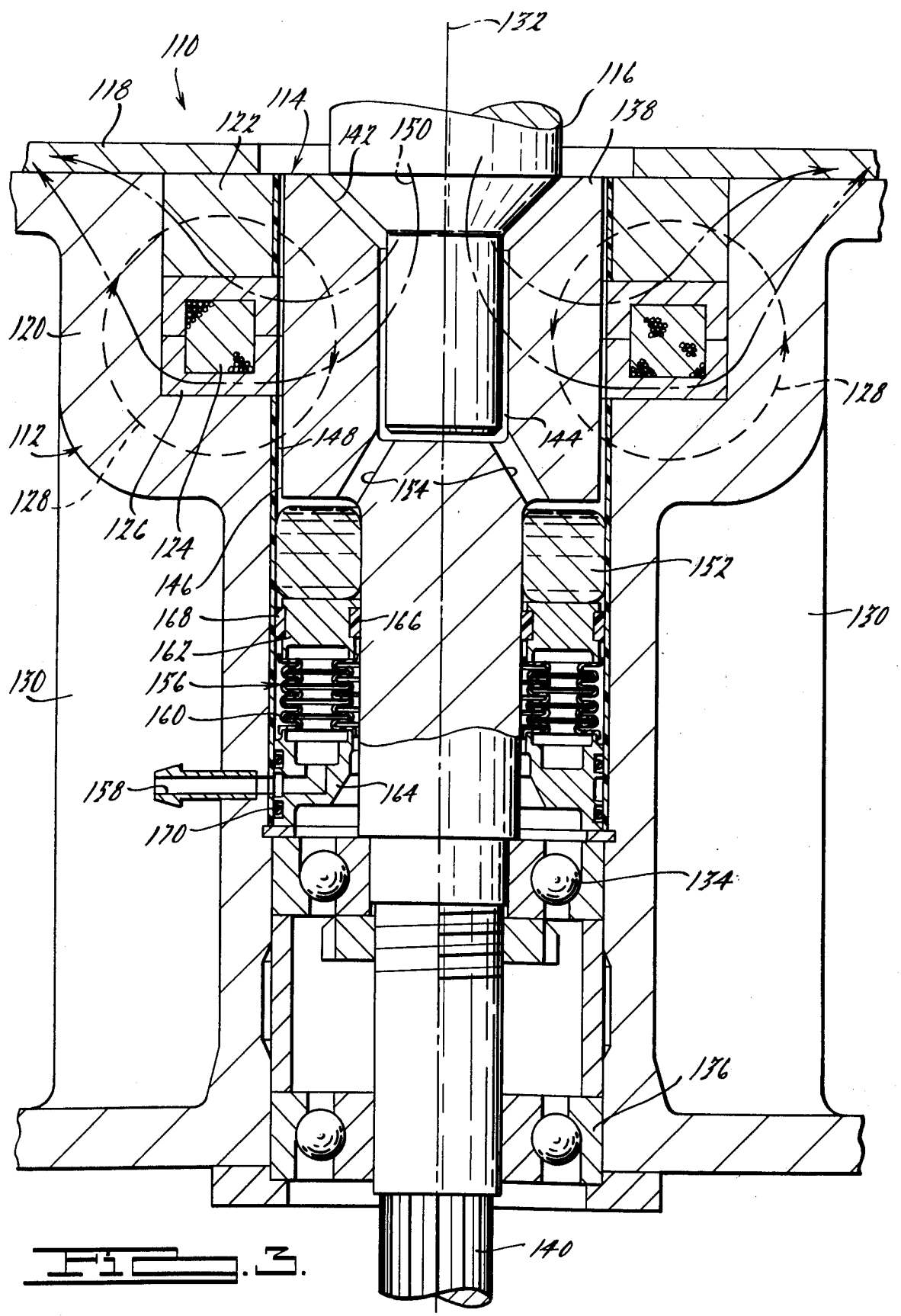
FIG. 3 is a sectional elevational view of a unipolar dynamoelectric motor having variable resistance control of motor current and, hence, speed and torque. The various components in FIG. 3 and of circular or annular construction.

With particular reference now to FIG. 3, there is shown a sectional view of a unipolar dynamoelectric motor generally designated by the numeral 110. The motor 110, as it is described herein, includes a stator generally designated by the numeral 114. Also provided is a control member 116 and an electrode or contact plate 118. Control member 116 and contact plate 118 are directly coupled to the opposite polarity terminals of the sodium-sulfur battery 12. The heat engine may be the type using liquid sodium at different temperatures in regions separated by a membrane to produce an EMF. The preferred battery is a sodium-sulfur battery, but others may be used to produce the low voltage required for the machine 110.

The stator 112 includes a first member 120 and a second member 122, both of these being in electrical contact with the contact plate 118 and together forming a housing. The stator also includes a field coil 124 that is surrounded by a conductive copper jacket 126, which may be formed by two identical annular channel-shaped elements as shown. A tube (not shown) for conducting a liquid coolant may be provided within the jacket 126 if necessary in a given machine application. Of course, other well known cooling techniques can be employed to improve machine efficiency and durability.

The field coil 125 is helically wound and produces the magnetic field indicated by the dashed lines 128. Thus, the direction of this magnetic field may be as indicated in the drawing or opposite in direction depending on the direction of current flow through the helical winding. Preferably, the first and second members 120 and 122 of the stator are made from ferromagnetic and electrically conductive materials. Iron having the smallest amount of carbon possible is desirable for these components. Component or member 122 of the stator is annular in shape and is used to provide a flux path for the magnetic flux produced by the field coil as well as to fill the space in the stator left empty prior to insertion of the field coil and its copper jacket into the stator during machine assembly. The member 120 has ribs 130, which preferably are formed as an integral part of the member 120.

The stator 112 has a central opening within it that is of circular cross-section throughout and which defines an axis 132. The rotor 114 is journalled for rotation about this axis by means of ball bearing assemblies 134 and 136. The rotor 114 includes an upper rotor portion 138 and an output shaft 140 that is threaded into rotor portion 138. Preferably, the rotor portion 138 is made from iron having a minimum carbon content and is ferromagnetic and electrically conductive.

The rotor portion 138 has a combined cylindrical and conical opening 142 in it in which the similarly shaped control member 116 is received. Rotor portion 138 rotates about control member 116, and these components are concentrically mounted with respect to axis 132. A first annular or cup-shaped space 144 is formed between the reduced-diameter portion of the control member 116 and the surface of rotor portion 138 which receives the control member and defines the opening 142. A second annular space 146 is located between the outer surface of rotor portion 138 and the surface of the stator opening. The stator has an insulating material 148 covering the surface area defining the stator opening, except on the surface of the copper jacket 126 located radially opposite the rotor portion 138. Current flow within the unipolar motor is indicated by the dot-dash lines 150 for the situation in which the annular spaces 144 and 146 contain a conductive material. It may be seen that this current flow is concentrated, due to the presence of the insulating material 148, in the copper jacket of the stator. This improves motor efficiency by tending to keep the direction of current flow perpendicular to the magnetic field lines 128. Of course, the torque produced by the motor is a function of the cross-product of these current and magnetic field vectors and is a maximum if they are mutually perpendicular.

A conductive liquid metal 152 is located within a cavity formed between the rotor portion 138 and the stator housing member 120. Mercury is the preferred liquid metal for this application, but liquid sodium, gallium, or gallium-indium alloys also may be used where the machine is utilized at temperatures sufficient to maintain these materials in a liquid state.

The second annular space 146 is located radially outward, with respect to the axis 132, of the first annular space 144, and the cavity in which the liquid metal 152 is located is separated from the first annular space 144 by the portion 138 of the rotor. Passages 154 interconnect the cavity in which the liquid metal is located with the first annular space 144.

A force producing means is provided in the form of an axially movable bellows assembly 156. The bellows assembly is of toroidal shape, is hollow, and has a tubular inlet 58 to permit air or other fluid pressure to be introduced into the assembly. The assembly walls include corrugated, preferably metal, walls 160 that are attached in sealing arrangement with upper and lower washer-sahped members 162 and 164. Member 162 is axially movable, is made from a metallic material, and has high-temperature plastic or other annular seals 166 and 168 to prevent the liquid metal 152 from passing the bellows assembly 156. O-ring seals 170 also are provided for this purpose.

When air or other fluid pressure is applied through inlet 158 to the bellows assembly interior, member 162 of the bellows assembly is forced to move with respect to the axis 132 (upwardly and against the force of gravity as viewed in the drawing), thereby, forcing the liquid metal 152 into the first and second annular spaces 144 and 146, respectively. The liquid metal 152 enters the first annular space 144 through the passages 154. The force applied to, and resultant movement of, the member 162 determine the amount of liquid metal entering the first and second annular spaces. With the liquid metal 152 located as shown in the drawing, there is infinite resistance between the control member 116 and the stator 112. However, when the liquid metal enters the first and second annular spaces such that liquid metal in the first annular space contacts the control member 116 and the rotor portion 138 and such that liquid metal in the second annular space contacts the rotor portion 138 and the stator 112, then electrical current can flow from the control member 116 to the stator or vice versa. With the insulating material 148 located as shown in the drawing, the liquid metal in the second annular space 146 must flow axially upwardly as viewed in the drawing until it actually contacts the copper jacket 126.

The greater the amount of liquid metal in the first and second annular spaces 144 and 146, the lower is the resistance between the control member 16 and the contact plate 118. The supply voltage for motor 110 is applied between contron member 116 and contact plate 118 and may have a magnitude of about one and one-half volts. The control member 116 preferably is made from a substantially conductive material, that is, while it is not a perfect conductor, it will have a resistivity not greatly above that of the other conductive materials in the machine 110. Of course, the amount of liquid metal in the annular spaces 144 and 146 determines the motor current because the resistance to current flow varies as a function of the amount of surface area of the control member, rotor and stator contacted by the liquid metal.

As the rotor 114 rotates, there is a tendency for the liquid metal in the first annular space 144 to decrease in volume and for the amount of liquid metal in the second annular space 146 to increase in volume. In other words, the volume of liquid metal in the annular space 144 is inversely proportional to rotor angular velocity and the amount in the annular space 146 is directly proportional to rotor angular velocity. This results from centrifugal force acting on the liquid metal, there is a vortex-generating effect that occurs because the second annular space 146 is located radially outward from the first annular space 144. This vortex effect is desirable in that, with respect to the application of the motor to electric vehicles, it is desirable to reduce the motor current flow as a hyperbolic function of the motor speed.

Since, due to the aforementioned vortex effect, the height of the liquid metal in the space 144 and its height in the space 146 are hyperbolic functions of the rotor speed and since the resistance to current flow thereby is a hyperbolic function of rotor speed, the motor design described herein is particularly suitable for vehicle traction applications.

The insulating material 148 preferably is a nonconductive ceramic or high-temerpature polyimide material. Also, with respect to the copper jacket 126, nickel coating and rhodium flash are provided thereon in the portion thereof located in the second annular space 146 to minimize the resistance to current flow in this location. With respect to the corrugated metal portion of the bellows assembly 156, it is preferred that this be formed from a nickel or nickel alloy. The iron from which the bulk of the stator 112 is formed may be armco iron. This is a very low carbon iron.

When the motor 110 is used in vehicles or other applications requiring speed control, the air or fluid pressure applied to the bellows assembly 156 through the inlet 158 may be controlled by an accelerator pedal connected to an air bellows or the like and may be operated by a vehicle or machine operator.

Based upon the foregoing description of the invention, what is claimed is:

1. A drive train for an electric vehicle, said drive train comprising:
   a DC source of electrical energy, said DC source including a container having an electrically conductive container portion and a liquid metal within said conductive container portion, said conductive container portion being one electrode, either cathode or anode, of said DC source, said DC source having an other electrode and producing a voltage between said one and said other of said electrodes;
   a unipolar motor, said unipolar motor having a stator attached to said container, said stator having a conductive portion electrically coupled to said conductive container portion, said unipolar motor having a rotor including a shaft and a conductive rotor portion, said unipolar motor including means for electrically coupling said rotor portion to said stator portion and to said other of said electrodes, thereby, to permit current flow between said one and said other of said electrodes through said stator and rotor portions and through said coupling means;
   a differential for a vehicle, said differential being driven by said shaft of said unipolar motor, said differential being attached to said stator of said unipolar motor;
   the current flow through said unipolar motor being controllable by said means for electrically coupling said rotor portion to said stator portion and to said other electrode of said DC source and said rotor shaft being driven at a speed and torque determined by said current flow.

2. A drive train for an electric vehicle in accordance with claim 1, wherein said means for electrically coupling said rotor to said other electrode of said DC source comprises a control member electrically coupled to said other electrode of said DC source, said control member extending into said unipolar motor, said rotor portion of said unipolar motor rotating about said control member, and said unipolar motor including liquid metal means for controlling the electrical resistance between said control member and said rotor portion and between said stator portion and said rotor portion.

3. A drive train for an electric vehicle in accordance with claim 1, wherein said unipolar motor is located between said DC source and said differential.

4. A drive train for an electric vehicle in accordance with claim 3, wherein said differential is located beneath said DC source and beneath said unipolar motor.

5. A drive train for an electric vehicle in accordance with claim 2, wherein said unipolar motor is located between said DC source and said differential.

6. A drive train for an electric vehicle in accordance with claim 5, wherein said differential is located beneath said DC source and beneath said unipolar motor.

7. A drive train for an electric vehicle in accordance with claim 1, wherein said container of said DC source has a recess therein, said stator of said unipolar motor being attached to said DC source at a location within said recess.

8. A drive train for an electric vehicle in accordance with claim 2, wherein said container of said DC source of electrical energy includes a recess, said stator of said unipolar motor being attached to said DC source of electrical energy at a location within said recess and said unipolar motor being located beneath said DC source and between said differential and said DC source.

9. A drive train for an electric vehicle, said drive train comprising:
   a DC source of electrical energy having a plurality of cells connected in parallel, said DC source including an electrically conductive container forming one electrode, either anode or cathode, common to each of said cells and each of said cells having second electrodes, an electrically conductive member interconnecting said second electrodes of said cells, and a control member electrically connected to said conductive member and extending from it, said control member projecting away from said DC source and being located in a recess formed in said container;
   a unipolar motor, said unipolar motor having a stator including a housing portion in electrically conductive relation to said container and being located in said container recess, said unipolar motor having a rotor, a portion of said rotor being rotatable about said control member, said DC source producing a voltage appearing across said control member and said housing portion of said unipolar motor stator;
   means for controlling current flow between said control member and said stator; and
   a differential having an input coupled to said rotor of said unipolar motor and having an output adapted to rotate a wheel.

* * * * *